Aug. 15, 1961   F. K. H. NALLINGER   2,996,309
MOTOR VEHICLE HAVING PNEUMATIC SPRINGS AND A STEERING
MECHANISM CONTROLLING SAID SPRINGS
Filed July 9, 1959
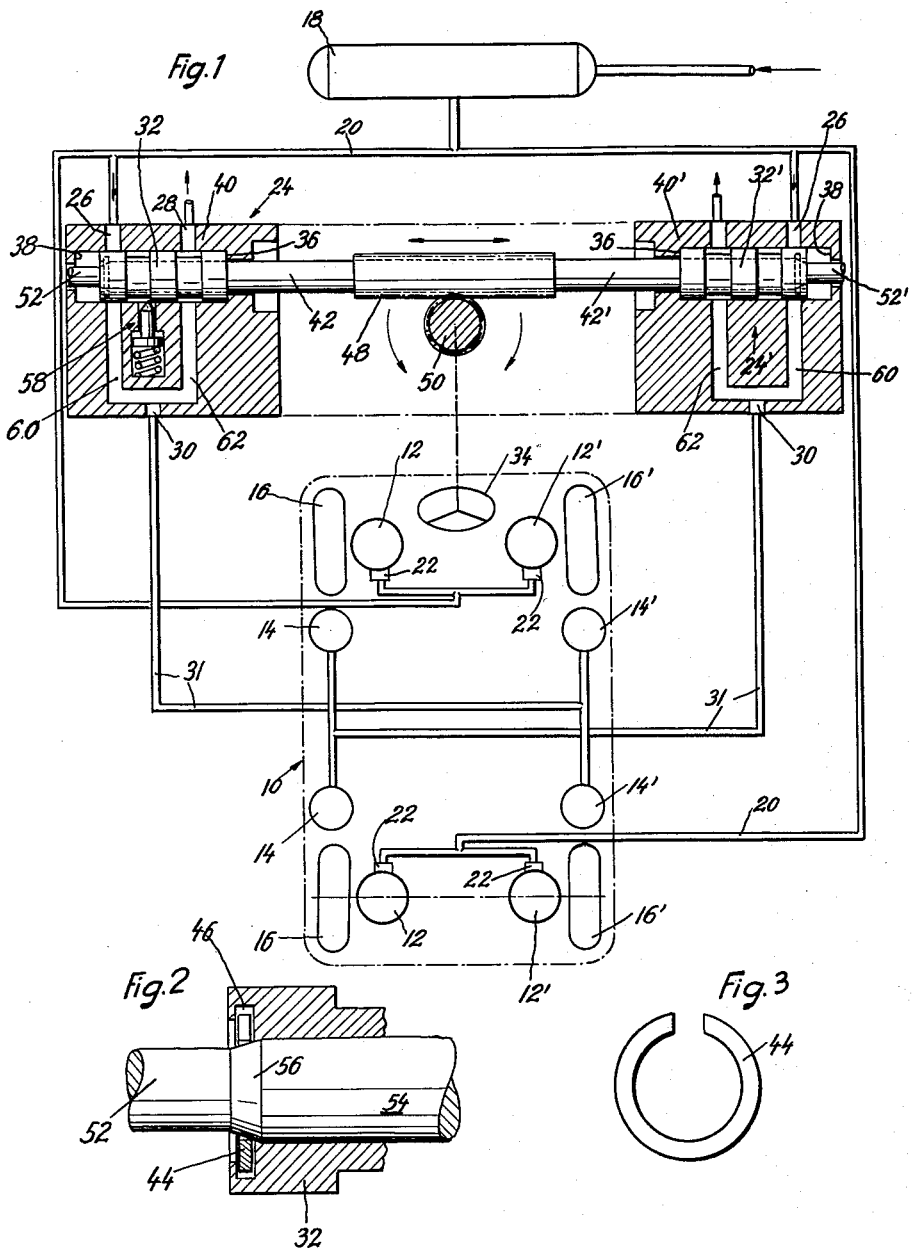
Inventor
FRIEDRICH K. H. NALLINGER
BY Dicke, Craig and Freudenberg
Attorneys

United States Patent Office 2,996,309
Patented Aug. 15, 1961

2,996,309
MOTOR VEHICLE HAVING PNEUMATIC SPRINGS AND A STEERING MECHANISM CONTROLLING SAID SPRINGS
Friedrich K. H. Nallinger, Stuttgart, Germany, assignor to Daimler-Benz Aktiengesellschaft, Stuttgart-Unterturkheim, Germany
Filed July 9, 1959, Ser. No. 825,925
Claims priority, application Germany July 9, 1958
10 Claims. (Cl. 280—112)

My invention relates to a motor vehicle having pneumatic springs and a steering mechanism controlling said springs so as to counteract the banking effect exerted on the body by centrifugal forces, when the vehicle is driven through curves.

It is the primary object of my invention to provide an improved control system which is responsive to movements of the steering mechanism and so controls pneumatic springs of the vehicle as to cause the latter to increase the supporting force exerted on the body of the vehicle on the outside of the curve while reducing the supporting force exerted by the springs on the body at the inside of the curve. More particularly, it is an object of my invention to provide an improved control system of the kind indicated which is simple, reliable in operation, capable of easy installation and of light weight and requires a minimum of space. A more specific object of my invention is the provision of an improved control system for pneumatic springs of the vehicle which in response to movement of the steering mechanism from the central position thereof beyond a limited angle will immediately inflate at least one pneumatic spring at the outside of the curve while keeping a pneumatic spring provided at the inside of the curve in deflated condition, and which in response to a return movement of the steering mechanism will immediately start deflating the pneumatic spring provided at the outside of the curve.

Further objects of my invention will appear from a detailed description of a preferred embodiment thereof with reference to the accompanying drawing and the features of novelty will be pointed out in the claims. It is to be understood, however, that my invention is in no way limited to such details but is capable of numerous modifications within the scope of the appended claims and that the terms and phrases used in such detailed description have been chosen for the purpose of explaining the invention rather than that of restricting or limiting the same.

In the accompanying drawing,

FIG. 1 is a diagrammatic representation of my novel control system applied to a motor vehicle provided with pneumatic main springs and pneumatic auxiliary springs, FIG. 2 is a detail illustrated in FIG. 1 shown in an axial section, and FIG. 3 is a side view of a split ring shown in FIG. 2.

In FIG. 1 I have diagrammatically illustrated the body 10 of a motor vehicle in plan view, such body being supported by main springs 12, 12' and by auxiliary springs 14, 14' on wheels 16, 16'. The auxiliary springs 14, 14' and, preferably, the main springs 12, 12' are pneumatic springs, for instance bellows filled with compressed air. As the design and installation of such pneumatic springs are well known, a detailed description thereof may be dispensed with. It will be sufficient to mention that the wheels are guided for up and down movement relative to the body by suitable elements which are movable with respect to the body and are suitably connected with the pneumatic springs mounted on the body. In the embodiment shown one auxiliary spring 14, or 14' respectively, and one main spring 12, or 12' respectively, are coordinated to each left-hand wheel 16 and to each right-hand wheel 16'. As the vehicle is provided with four wheels, there are four main springs and four auxiliary springs.

A reservoir 18 constituting a source of compressed air and fed by a suitable compressor (not shown) driven by the engine of the motor vehicle is mounted on the body 10 although for sake of clarity it is shown at an isolated position in FIG. 1. A system 20 of supply pipes connects the reservoir 18 with inlet ports of valves 22 coordinated to the main springs 12, 12'. Each valve 22 is also provided with a discharge port opening into the atmosphere and with a port communicating with the air space of the associated main spring. The valve member of each valve 22 is so connected with the associated wheel or, strictly speaking, with the wheel guiding elements as to inflate the main spring when the body 10 is depressed towards the wheel beyond a certain limit and as to deflate the spring when the body 10 is raised above the wheel beyond such limit. The inflation and deflation through valve 22 proceed at so low a rate that the valve 22 will be effective to maintain the average elevation of the vehicle above the wheel constant irrespective of variations of the load of the vehicle. As such automatic elevation-controlling valves are well known in the art and do not form part of the present invention, they need not be described in detail.

My invention is concerned with the control of the pneumatic springs 14, 14' in response to movements of the steering mechanism of the vehicle. For that purpose, I have provided a pair of valves 24 and 24', each such valve being coordinated to one set 14, 14' of pneumatic springs and being provided with a port 26 communicating with the source 18 of compressed air, with a discharge port 28 opening into the atmosphere and with a port 30 communicating with the associated set 14, or 14' respectively, by pipes 31. Moreover, each valve is provided with a valve member 32, or 32' respectively, which is movable to a loading position for connecting port 30 via port 26 with the source 18 of compressed air and to the discharge position shown for connecting port 30 with the discharge port 28.

Moreover, the motor vehicle is equipped with the conventional steering mechanism including a steering wheel 34 which is rotatable from a central position into opposite directions for steering the vehicle straight ahead or to the right or to the left. Moreover, suitable means are connected with and are movable by the steering mechanism and are so constructed and cooperatively connected with the valve members 32 and 32' that positioning the steering wheel to a limited central zone comprising a restricted angle enables such means to leave each of the valve members 32 and 32' in the discharge position shown in which they abut internal shoulders 36 of the valve housings. Moreover, such means are so constructed that movement of the steering mechanism from such central zone into one of said directions, i.e. a turn of the steering wheel in anticlockwise direction beyond said restricted angle, in the initial phase of such movement causes said means to actuate the valve member 32 only and that movement of the steering mechanism from said central zone into the other one of said directions in the initial phase of such movement causes said means to actuate the valve member 32' only, such actuation of each valve member 32 or 32' being a movement thereof from the inner discharge position, where it abuts shoulder 36, to an outer loading position in which the valve connects port 30 with port 26 and cuts it off from port 28 to thereby inflate that set of springs 14, 14' that is located at the outside of the curve.

Moreover, the aforementioned means are so constructed and connected with the valve members 32, 32' that return movement of the steering mechanism to the central zone in the initial phase of such return movement causes said means to return the actuated valve member 32, or 32' respectively, from the loading position in which it abuts a shoulder 38 to the discharge position.

In the embodiment shown each valve member 32, or 32' respectively, is a plunger which is movable in a valve housing 40, or 40' respectively, and is provided with an axial bore. The aforementioned means includes a rod 42, or 42' respectively, which extends through the bore of the plunger. Moreover, suitable friction means are provided which establish frictional engagement between the valve member 32, or 32', and the rod 42, or 42'.

Preferably, such friction means is a split ring 44, FIGS. 2 and 3, that is mounted on the plunger 32, or 32', for common axial displacement therewith and embraces the rod 42, or 42'. Preferably, the hollow plunger 32, or 32' respectively, is provided with an internal groove 46 near its outer end and the split ring 44 is mounted within the groove 46 and is capable of embracing the rod 42, or 42' respectively, in contact therewith.

The valve housings 40 and 40' each of which is provided with the ports 26, 28, 30, or 26', 28', 30' respectively, are fixed to the body 10 of the vehicle in spaced coaxial relationship and the two rods 42, 42' which are likewise coaxial are preferably integral with each other constituting a single rod having rack teeth 48 meshing with a pinion 50 fixed to the shaft of the steering wheel 34. Therefore, any turn of the steering wheel will cause axial displacement of the rod 42, 42'. This rod has end sections 52, 52' of reduced diameter which are joined to the central section 54 of the rod by conically tapering sections 56. These sections 56 are spaced a distance which does not exceed the minimum distance of the grooves 46 of the plungers 32 and 32'. Suitable spring detents may be provided for holding the valve members 32 and 32' in their inner discharge positions shown and preventing accidental displacement therefrom. In FIG. 1 such a detent comprising a spring pressed plunger guided in a diametrical bore of housing 40 and engaging a shoulder of the plunger 32 is indicated at 58.

Each plunger has a pair of peripheral grooves spaced a lesser distance than the ports 26 and 28 for alternative registry therewith and with branch conduits 60 and 62 provided in each valve housing and communicating with the port 30. In its inner discharge position each plunger in abutment with the shoulder 36 establishes communication between the ports 30 and 28 via conduit 62 and one of the peripheral grooves of the plunger while interrupting the communication of conduit 60 with port 26. In its loading position each plunger is in abutment with a shoulder 38 of the valve housing and in this position establishes communication between the ports 30 and 26 via the duct 60 and the other peripheral groove while blocking the communication between the conduit 62 and the port 28. When the steering mechanism is in its central zone, the conical sections 56 of the rod 42, 42' are located between the split rings 44 of the valve members 32, 32' which are resiliently held by the spring detents 58 in their inner discharge positions. When the steering mechanism is moved from its central zone into one or the other direction, the initial phase of such movement causes one of the tapering sections 56 of the rod 42, 42' to engage one of the split rings 44 to thereby displace the plunger carrying such split ring to its outer loading position and to subsequently slip through the split ring for frictional engagement therewith. Therefore, when the steering wheel is returned to its central position, the initial phase of such return movement causes the rod 42, 42' by its frictional engagement with the actuated valve member to return same from the loading position to the discharge position. Displacement of each valve member 32 or 32' from its inner discharge position shown into its outer loading position causes the associated set 14 or 14' of the springs to be immediately inflated by the compressed air flowing from the reservoir 18 through the pipe system 20, the actuated valve 24 whose valve member is in loading position, through the port 30 thereof and through the pipe 31. As a result, the set of springs 14, or 14' respectively, located at the outside of the curve through which the vehicle is driven will be inflated and will produce a force counteracting the banking couple exerted by the centrifugal force upon the vehicle. The inflated set of springs, however, will be immediately deflated when the driver commences to straighten out the vehicle by turning the steering wheel back to normal irrespective of the total angular displacement of the steering wheel. The immediate inflating operation in the initial phase of the steering motion and the initial deflation in the initial phase of the return motion of the steering mechanism is a valuable feature of my invention, as it gives my novel control system the time required to effect full inflation and deflation of the pneumatic springs. As inflation commences in the initial phase of the turn from the steering wheel from its central normal position, the inflation will be completed, when the driver will have turned the steering wheel to its maximum angular displacement resulting in the maximum banking effect produced by the centrifugal force upon the body of the vehicle. By the time this maximum banking effect will be reached, the springs located at the outside of the curve will be fully inflated. Similarly, the springs will be fully deflated when the driver will have straightened out the vehicle again.

While in the embodiment described the main springs 12 and 12' are likewise pneumatic springs, this is not a material feature of my invention, as other springs may be substituted therefor.

From the foregoing it will be seen that this invention is one well adapted to attain all of the ends and objects hereinabove set forth, together with other advantages which are obvious and which are inherent to the combination.

While the invention has been described in connection with a preferred embodiment thereof, it will be understood that it is capable of further modification, and this application is intended to cover any variations, uses, or adaptations of the invention following, in general, the principles of the invention and including such departures from the present disclosure as come within known or customary practice in the art to which the invention pertains, and as fall within the scope of the invention or the limits of the appended claims.

What I claim is:

1. In a motor vehicle the combination comprising a body, right-hand wheels, left-hand wheels, at least one right-hand pneumatic spring interposed between said right-hand wheels and said body, at least one left-hand pneumatic spring interposed between said left-hand wheels and said body, a source of compressed air, a pair of valves, each valve being coordinated to one of said springs and being provided with a port communicating with said source, with a discharge port opening into the atmosphere, with a port communicating with one of said springs and with a valve member movable to a loading position for connecting said last-mentioned port with said source and to a discharge position for connecting said last-mentioned port with said discharge port, a steering mechanism movable from a central position into opposite directions for steering said vehicle straight ahead or to the right or to the left, and means connected with and movable by said steering mechanism and cooperatively connected with said valve members, said means being so constructed and arranged that positioning said steering mechanism in a limited central zone leaves each of said valve members in said discharge position and that movement of said steering mechanism from said central zone in one of said directions causes said means in the initial phase of such movement to actuate one of said valve members only and that movement of said steering mechanism from said central zone in the other one of said directions causes said means in the initial phase of such movement to actuate the other one of said valve members only, such actuation of each valve member by said means being a movement thereof from said discharge position to said loading position and that return movement of said steering mechanism to said central position in the initial phase of such return movement causes said means to return said actuated valve member from said loading position to said discharge position.

2. The combination claimed in claim 1 in which each of said pneumatic springs is an auxiliary spring, and including main springs individually coordinated to said wheels for springing said body when said auxiliary springs are disabled by discharge of air therefrom.

3. In a motor vehicle the combination comprising a body, right-hand wheels, left-hand wheels, at least one right-hand pneumatic spring interposed between said right-hand wheels and said body, at least one left-handed pneumatic spring interposed between said left-hand wheels and said body, a source of compressed air, a pair of valves, each valve being coordinated to one of said springs and being provided with a port communicating with said source, with a discharge port opening into the atmosphere, with a port communicating with one of said springs and with a plunger movable between a loading position for connecting said last-mentioned port with said source and a discharge position for connecting said last-mentioned port with said discharge port, said plunger being provided with an axial bore, a steering mechanism movable from a central position into opposite directions for steering said vehicle straight ahead or to the right or to the left, means including a rod extending through said bore of said plunger, and friction means establishing frictional engagement between said plunger and said rod, said means being connected with and movable by said steering mechanism and being so constructed and cooperatively connected with said plungers that positioning said steering mechanism to a limited central zone enables said means to leave each of said plungers in said discharge position and that movement of said steering mechanism from said central zone into one of said directions in the initial phase of such movement causes said means to actuate one of said plungers only and that movement of said steering mechanism from said central zone into the other one of said directions in the initial phase of such movement causes said means to actuate the other one of said plungers only, said actuation of each plunger being a movement thereof from said discharge position to said loading position and that return movement of said steering mechanism to said central position in the initial phase of such return movement causes said means to return said actuated plunger from said loading position to said discharge position.

4. The combination claimed in claim 3 in which said friction means is a split ring mounted on said plunger for common axial displacement therewith and embracing said rod.

5. The combination claimed in claim 3 in which said plunger is provided with an internal groove, said friction means being a split ring mounted within said groove and embracing said rod in contact therewith.

6. The combination claimed in claim 3 in which said rod extending through said plunger of one of said valves is coaxially disposed with respect to and integral with said rod extending through said plunger of the other one of said valves.

7. In a motor vehicle the combination comprising a body, right-hand wheels, left-hand wheels, at least one right-hand pneumatic spring interposed between said right-hand wheels and said body, at least one left-hand pneumatic spring interposed between said left-hand wheels and said body, a source of compressed air, a pair of valves having housings fixed to said body in spaced relationship, each housing being provided with a port communicating with said source, with a discharge port opening into the atmosphere and with a port communicating with said one of said springs, a pair of spaced coaxial valve plungers each movable in said housing to an outer loading position for connecting said last-mentioned port with said source and to an inner discharge position for connecting said last-mentioned port with said discharge port, each of said plungers being provided with an axial passage-way having an internal groove, a single rod extending through the passage-ways of said plungers and having ends of reduced diameter joined to the central section of said rod between said ends by conically tapering sections spaced a distance not exceeding the minimum distance of said groove of one plunger from said groove of the other plunger, split rings in said grooves for frictionally engaging said central section of said rod, and a steering mechanism movable from a central position into opposite directions for steering said vehicle straight ahead or to the right or to the left and geared to said rod for axial displacement of the latter in response to the steering movement, said valves being so disposed that positioning said steering mechanism to a limited central zone will position said conically tapering sections between said split rings leaving each of said plungers in said inner discharge position and that movement of said steering mechanism from said central zone into one or the other of said directions in the initial phase of such movement causes one of said tapering sections of said rod to engage one of said split rings to displace the plunger carrying same to said outer loading position and to subsequently slip through said split ring for frictional engagement therewith.

8. In a motor vehicle the combination comprising a body, right-hand wheels, left-hand wheels, at least one right-hand pneumatic spring interposed between said right-hand wheels and said body, at least one left-hand pneumatic spring interposed between said left-hand wheels and said body, a source of compressed air, a pair of valves, each valve being coordinated to one of said springs and being provided with a port communicating with said source, with a discharge port opening into the atmosphere, with a port communicating with one of said springs and with a plunger movable to a loading position for connecting said last-mentioned port with said source and to a discharge position for connecting said last-mentioned port with said discharge port, a steering mechanism movable from a central position in opposite directions for steering said vehicle straight ahead or to the right or to the left, and means including a rod cooperatively connected with said plungers connected with and movable by said steering mechanism, said means being so constructed and arranged that positioning said steering mechanism in a limited central zone leaves each of said plungers in said discharge position and that movement of said steering mechanism from said central zone in one of said directions causes said means in the initial phase of such movement to actuate one of said plungers only and that movement of said steering mechanism from said central zone in the other one of said directions causes said means in the initial phase of such movement to actuate the other one of said plungers only, such actuation of each plunger by said means being a movement thereof from said discharge position to said loading position and that return movement of said steering mechanism to said central position in the initial phase of such return movement causes said means to return said actuated plunger from said loading position to said discharge position.

9. The combination claimed in claim 8, further comprising main springs individually coordinated to said wheels for springily mounting said body, said pneumatic springs serving as auxiliary springs, and said main springs springing said body when said auxiliary springs are disabled by discharge of air therefrom.

10. The combination claimed in claim 8, wherein there are at least two pairs of oppositely disposed right-hand and left-hand wheels, and two left-hand and two right-hand pneumatic springs, one of said pneumatic springs being positioned adjacent each of said wheels, and said left-hand pneumatic springs being operatively connected to the one plunger and said right-hand pneumatic springs being operatively connected with the another plunger.

References Cited in the file of this patent

UNITED STATES PATENTS

| | | |
|---|---|---|
| 2,490,719 | Tank | Dec. 6, 1949 |
| 2,759,741 | Newton | Aug. 21, 1956 |